(12) United States Patent
Pietron et al.

(10) Patent No.: US 9,174,573 B1
(45) Date of Patent: Nov. 3, 2015

(54) METHOD AND SYSTEM TO COACH DRIVER OF MANUAL TRANSMISSION VEHICLE

(71) Applicant: FORD GLOBAL TECHNOLOGIES, LLC, Dearborn, MI (US)

(72) Inventors: Gregory Michael Pietron, Canton, MI (US); Yuji Fujii, Ann Arbor, MI (US); James William Loch McCallum, Ann Arbor, MI (US); Christian Meyer, Birken (DE); Seunghoon Lee, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 14/288,987

(22) Filed: May 28, 2014

(51) Int. Cl.
| | |
|---|---|
| *B60Q 1/00* | (2006.01) |
| *B60Q 9/00* | (2006.01) |
| *F16H 57/01* | (2012.01) |
| *F16D 23/12* | (2006.01) |

(52) U.S. Cl.
CPC *B60Q 9/00* (2013.01); *F16D 23/12* (2013.01); *F16H 57/01* (2013.01); *F16D 2500/7101* (2013.01); *F16H 2057/014* (2013.01); *F16H 2057/016* (2013.01)

(58) Field of Classification Search
CPC .................. F16H 2037/0873; F16H 2063/426
USPC .............. 340/453, 439, 454, 438, 517, 524; 701/54, 64; 116/28.1
See application file for complete search history.

(56) References Cited

U.S. PATENT DOCUMENTS

| | | | |
|---|---|---|---|
| 4,701,852 A * | 10/1987 | Ulveland | 701/64 |
| 5,403,249 A | 4/1995 | Slicker | |
| 5,954,781 A * | 9/1999 | Slepian et al. | 701/96 |
| 7,530,924 B2 | 5/2009 | Brevick | |
| 2009/0005217 A1 | 1/2009 | Somerville et al. | |
| 2009/0264254 A1 | 10/2009 | Jaeggle et al. | |
| 2012/0261228 A1 | 10/2012 | Chen et al. | |
| 2012/0312222 A1 * | 12/2012 | Shinohara et al. | 116/28.1 |
| 2013/0038438 A1 * | 2/2013 | Olsen et al. | 340/439 |

* cited by examiner

*Primary Examiner* — Toan N Pham
(74) *Attorney, Agent, or Firm* — James Dottavio; Brooks Kushman P.C.

(57) ABSTRACT

A coaching system for drivers of vehicles monitors the power dissipation of a manual transmission clutch and, when the energy dissipated during an event is excessive, suggests modified driving technique. The system may monitor launch events, shift events, and steady state driving. The system may adjust the energy threshold at which a suggestion is provided based on vehicle weight or road gradient. The system may also adjust the energy threshold when an estimate of clutch temperature is elevated. The suggestion may be provided on a graphic display or may be provided verbally over a speaker. In some cases, the suggested may also be conveyed to a third party outside the vehicle.

18 Claims, 6 Drawing Sheets

FIG. 1 - PRIOR ART

METHOD AND SYSTEM TO COACH DRIVER OF MANUAL TRANSMISSION VEHICLE

TECHNICAL FIELD

This disclosure relates to the field of vehicle information systems. More particularly, the disclosure pertains to a system to provide information regarding manual transmission driving technique.

BACKGROUND

A typical manual powertrain is illustrated in FIG. 1. Solid lines represent mechanical power flow through rotating shafts. Dashed lines represent control connections, which may be implemented using mechanical linkages. Engine 10 generates power at crankshaft 12 by burning fuel. The engine responds to changes in the position of accelerator pedal 14 to generate more power when the pedal is depressed further by the driver. Transmission 16 transmits power from crankshaft 12 to driveshaft 18 which may rotate at a different speed than crankshaft 12. Transmission 16 includes a friction clutch 20 and a gearbox 22 connected by input shaft 24. Gearbox 22 is capable of establishing a variety of forward speed ratios and at least one reverse speed ratio in response to driver manipulation of shifter 26. The driver controls the torque capacity of clutch 20 by manipulation of clutch pedal 28. Differential 30 splits power from driveshaft 18 between a left axle 32 driving a left wheel 34 and a right axle 36 driving a right wheel 38 while permitting slight speed differences between the axles as the vehicle turns a corner.

For internal combustion engine 10 to generate power, crankshaft 12 must rotate at sufficient speed. However, when the vehicle is stationary with gearbox 22 establishing a speed ratio, input shaft 24 is also stationary. In order to start the vehicle moving, the driver controls the torque capacity of clutch 20 to transmit power from moving crankshaft 12 to stationary input shaft 24. As the vehicle accelerates the speed of input shaft 24 gradually increases until it is equal to the speed of crankshaft 12, at which point clutch 20 can be fully engaged. With clutch 20 fully engaged, the speed of crankshaft 12 is proportional to vehicle speed. As the vehicle accelerates in 1st gear, the speed of crankshaft 12 becomes excessive, necessitating a shift to 2nd gear. Gearbox 22 is not capable of changing ratios while transmitting power. Therefore, the driver shifts by disengaging clutch 20, then manipulating shifter 26 to change the gearbox ratio, then re-engaging clutch 20. Re-engagement of clutch 20 forces the crankshaft speed to become equal to input shaft speed, predominantly by changing the speed of the crankshaft.

Whenever clutch 20 transits torque between shafts rotating at different speeds, as during a vehicle launch event, some power must be dissipated. Power is the product of speed and torque. During a launch event, the torque exerted by the crankshaft and the torque exerted on the input shaft are both equal to the clutch torque capacity. The power flowing into the clutch is the torque capacity multiplied by the crankshaft speed. The power flowing out of the clutch mechanically is the torque capacity multiplied by the input shaft speed. The difference between the power inflow and the mechanical power outflow is dissipated by conversion into heat. Initially, the heat is absorbed into clutch components causing the temperature of those components to increase. Then, the heat is gradually transferred to the environment through convection, conduction, and radiation, gradually reducing the temperature of the clutch components.

The amount of energy dissipated by the clutch in a time interval is equal to the integral of the power dissipation over time. If an excessive amount of energy is dissipated in a short amount of time, the clutch temperature will rise excessively. When the clutch temperature is elevated, the rate of wear of the clutch facing material increased dramatically. At sufficiently high temperatures, the friction coefficient of the material decreases and the clutch may be incapable of achieving sufficient torque capacity. Driver technique in manipulating the accelerator pedal, clutch pedal, and shifter strongly influences energy dissipation.

SUMMARY OF THE DISCLOSURE

A method of coaching a driver of a vehicle with a manual transmission includes monitoring sensor values, estimating the power dissipation, and suggesting a driving technique change when the power dissipation is excessive. In one embodiment, the method determines that the energy dissipation is excessive by integrating the power dissipation over an event and comparing the integrated power to an energy threshold. The event may be a vehicle launch, a shift, or steady state driving with the clutch slipping for more than a threshold amount of time. In another embodiment, the energy dissipation is considered excessive if the power dissipation exceeds a power threshold for longer than a duration threshold. The method may employ multiple power thresholds each associated with corresponding duration thresholds for different types of events. The thresholds that define excessive power dissipation may be adjusted based on vehicle weight, road gradient, or estimated clutch temperature. Suggestions may be conveyed to the driver by, for example, a graphic display or a speaker. In some circumstances, the suggestion may be conveyed to a third party not in the vehicle via a communications interface.

For a launch event, the suggestion may be, for example, utilizing lower clutch torque capacity, utilizing lower engine speed, or reducing the frequency of launch events by waiting for more space between vehicles. For a shift event, the suggestion may be, for example, utilizing a lower engine speed or lower engine torque while re-engaging the clutch. For a steady state cruise with the clutch slipping, the suggestion may be to fully engage the clutch. When the clutch temperature is elevated

DETAILED DESCRIPTION

Figure 1:
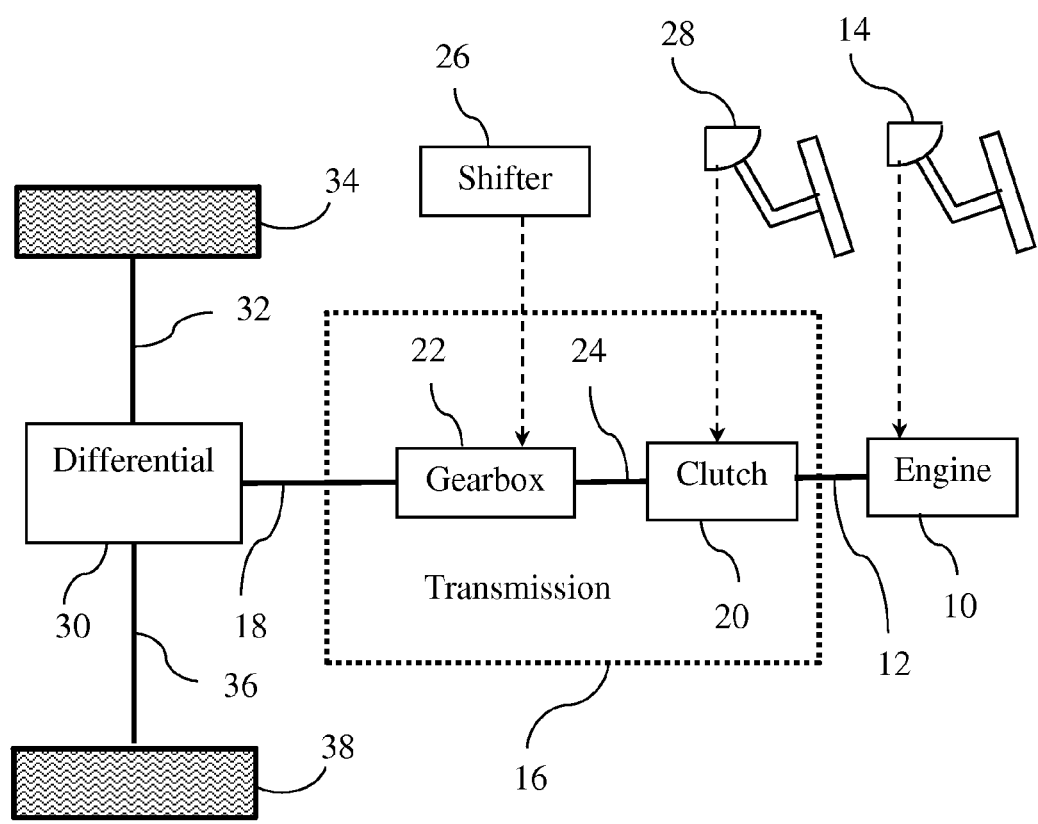
FIG. 1 is schematic illustration of a vehicle powertrain having a manual transmission.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In preparation for launching a vehicle from a stationary position, the driver uses shift lever 26 to select an appropriate gear ratio. Reverse is selected if the driver intends to move backwards and 1st gear is selected if the driver intends to move forward. During the launch event, the driver manipulates accelerator pedal 14 to control the amount of torque generated by engine 10 and manipulates the clutch pedal 28 to control the torque capacity of clutch 20. These actions must be carefully coordinated. The torque actually produced by the engine depends on both the accelerator pedal position and the crankshaft speed, generally increasing as crankshaft speed increases. If the clutch torque capacity exceeds the engine torque, then the crankshaft speed decreases. If the crankshaft speed decreases excessively, an engine stall occurs. On the other hand, if the engine torque exceeds the clutch torque capacity, then the crankshaft speed increases.

When the vehicle is on level ground the amount of energy dissipation is primarily determined by the crankshaft speed maintained during the launch event. A higher crankshaft speed increases the energy dissipation in two ways. First, at a given input shaft speed and clutch torque capacity, a higher crankshaft speed increases the power dissipation. Second, the launch event will continue until the input shaft speed is equal to the crankshaft speed. Increasing crankshaft speed increases the duration of the launch event. The average clutch torque capacity during the launch event has little overall direct impact on the energy dissipated. Although a higher clutch torque capacity increases the power dissipation, it also shortens the event duration. The consequence of launching the vehicle more aggressively is indirect. Launching more aggressively may require maintaining a higher crankshaft speed during the event to avoid engine stall.

Figure 2:
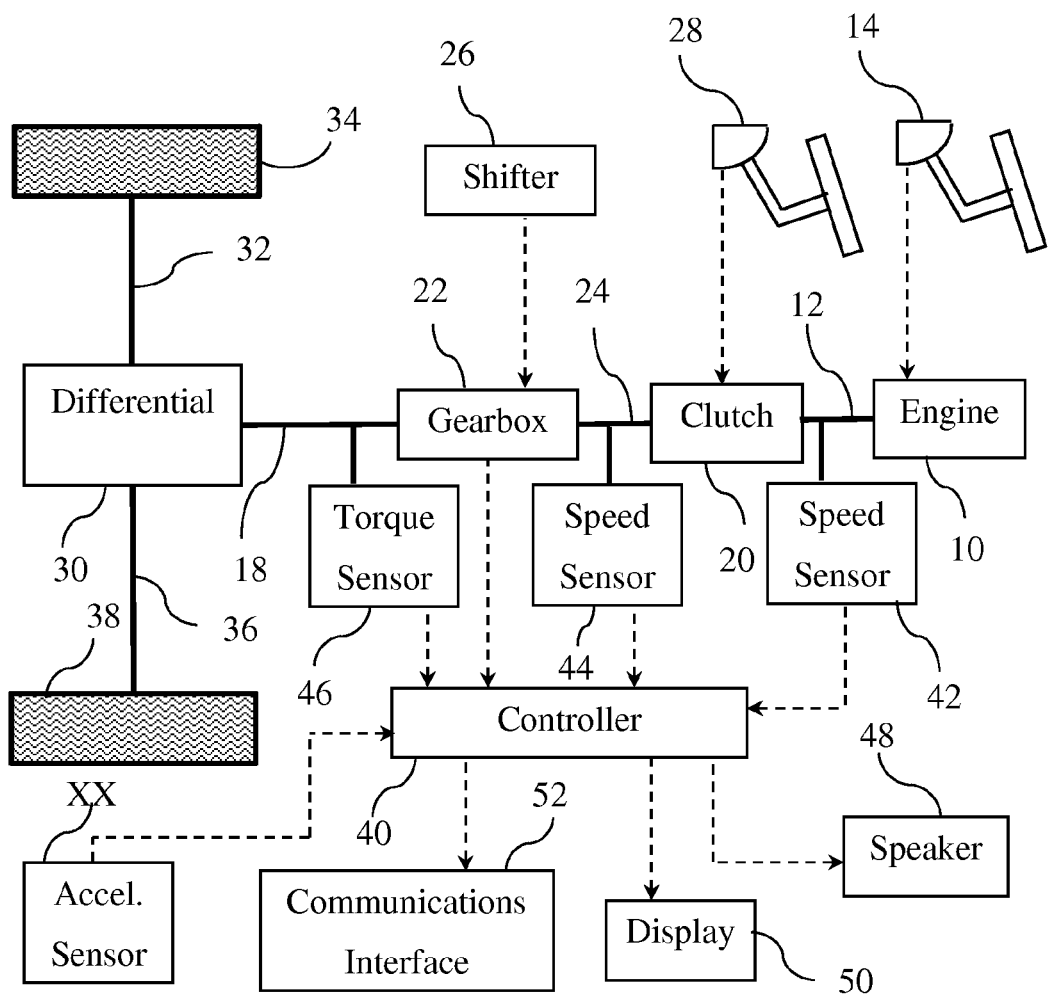
FIG. 2 is a schematic illustration of a vehicle powertrain having a manual; transmission supplemented with a driver coaching system.

When the energy dissipation associated with a launch is excessive, a driver coaching system, as illustrated in FIG. 2, can assist the driver in manipulating clutch pedal 28 and accelerator pedal 14 to reduce energy dissipation on future events. Controller 40 monitors crankshaft speed sensor 42 and input shaft speed sensor 44 to determine the slip speed across clutch 20. Controller 40 also monitors torque sensor 46 which, in conjunction with information about the gearbox ratio, indicates clutch torque capacity during a launch event. Alternatively, torque could be measured at the crankshaft or input shaft or could be estimated based on an estimate of engine torque. When the controller determines that the energy dissipation was excessive, the controller suggest modified technique via either speaker 48 or display device 50. These devices may be capable of providing the suggestions with varying levels of urgency. For example, the display may use a different color or an audible suggestion may be accompanied by a warning horn. In some circumstances, a third party outside the vehicle, such as a parent or a dispatcher, may wish to be informed of excessive energy launches. If such as request has been registered with the controller, the controller may also send the suggestion via communications interface 52. Communication interface 52 may be, for example, an interface with a cell phone.

Figure 3:
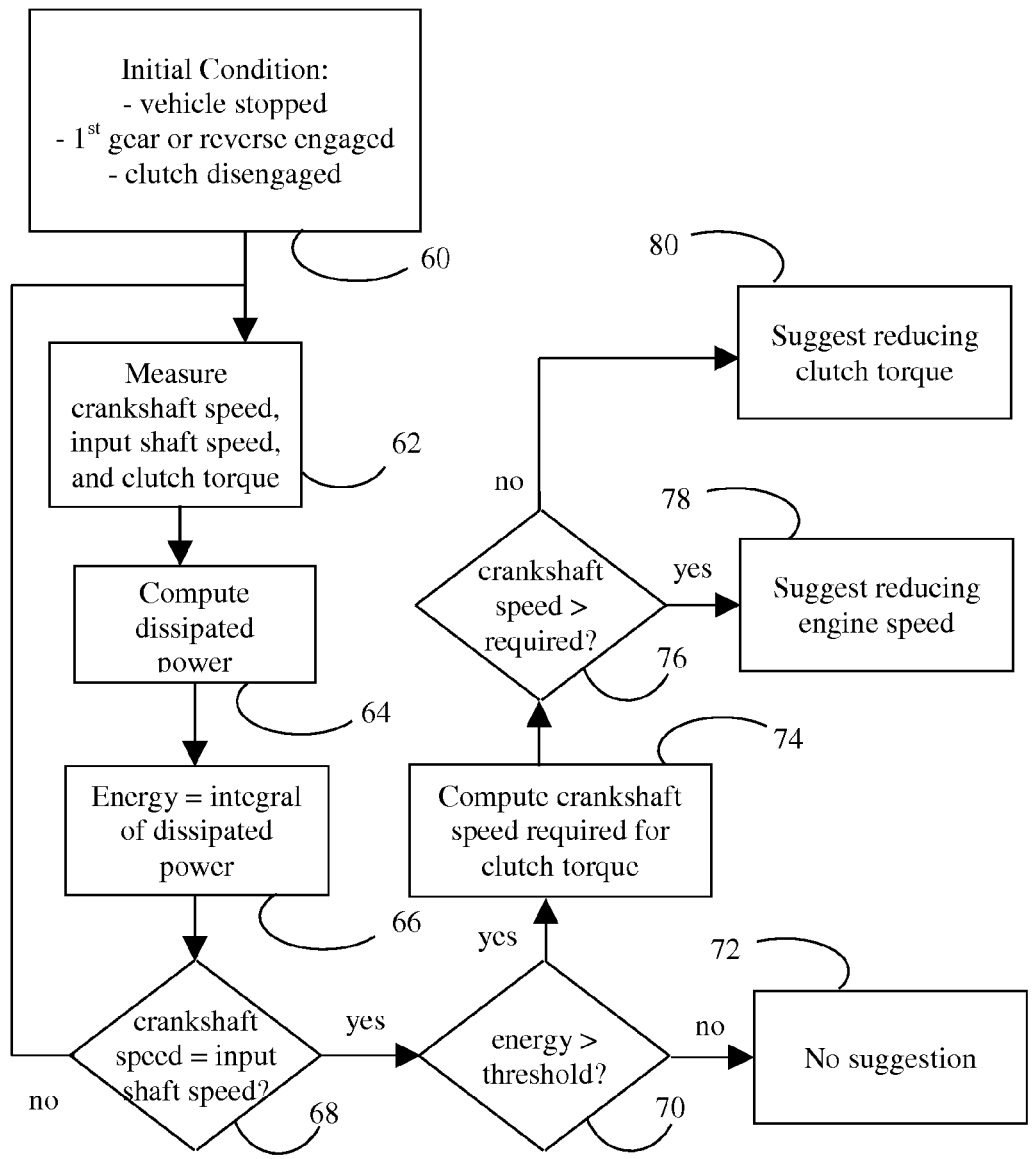
FIG. 3 is a flow chart for a method of providing driving technique suggestions following vehicle launch events.

FIG. 3 illustrates the method in the form of a flow chart. The method begins at 60 with the vehicle stationary, reverse of 1st gear engaged, and the clutch disengaged. The energy for the event is initially zero. During the launch event, the method loops to compute the energy dissipated. At 62, the controller measures or estimates crankshaft speed, input shafts speed, and clutch torque. At 64, the controller computes the power dissipated by subtracting the input shaft speed from the crankshaft speed and multiplying the result by the clutch torque. At 66, the controller updates the energy by multiplying the power by the controller time step and adding the result to the previous value. The end of the launch event is determined at 68 if the crankshaft speed and the input shaft speed are equal. When the event is complete, the controller moves to 70 and determines if the energy is greater than a threshold. If not, then the method terminates at 72 without making any suggestion. If the energy exceeds the threshold, then at 74 the controller computes the crankshaft speed that would be required to provide a margin above engine stall at the clutch torque that the driver utilized. For example, this can be determined based on the engine maximum torque versus speed curve by finding the minimum speed at which the engine could produce 50% more torque than the torque capacity. At 76, the controller determines whether the actual crankshaft speed exceeded the recommended value. If so, at 78 the controller suggest to the driver that engine speed be maintained at a lower value for future launches. If not, at 80 the controller the controller suggests reducing clutch torque to enable reducing engine speed.

The energy dissipated during a launch event also depends upon the way the vehicle is loaded and the gradient of the road. When a vehicle is heavily loaded or going uphill, the acceleration rate is lower for a particular clutch torque capacity. Consequently, a launch at that torque capacity requires longer. Because the power dissipation is unchanged, a launch event of longer duration results in increased energy dissipation.

Because a launch requires more energy dissipation when the weight or road gradient are increased, even with excellent driving technique, the controller may increase the threshold at which driving advice is given. In addition to the advice discussed above, the controller may advise the driver to consider unloading cargo. When the vehicle is on an uphill grade, launching at higher torque capacity may decrease energy dissipation. Any increase in power dissipation associated with higher required engine speed may, in some circumstances, be outweighed by reduced launch duration. After determining that the energy is higher than the revised threshold, the controller may calculate the energy that would have been dissipated at a higher torque capacity and, if that reduces energy dissipation, may suggest to the driver that future launches on a comparable grade be performed at a higher torque capacity.

Figure 4:
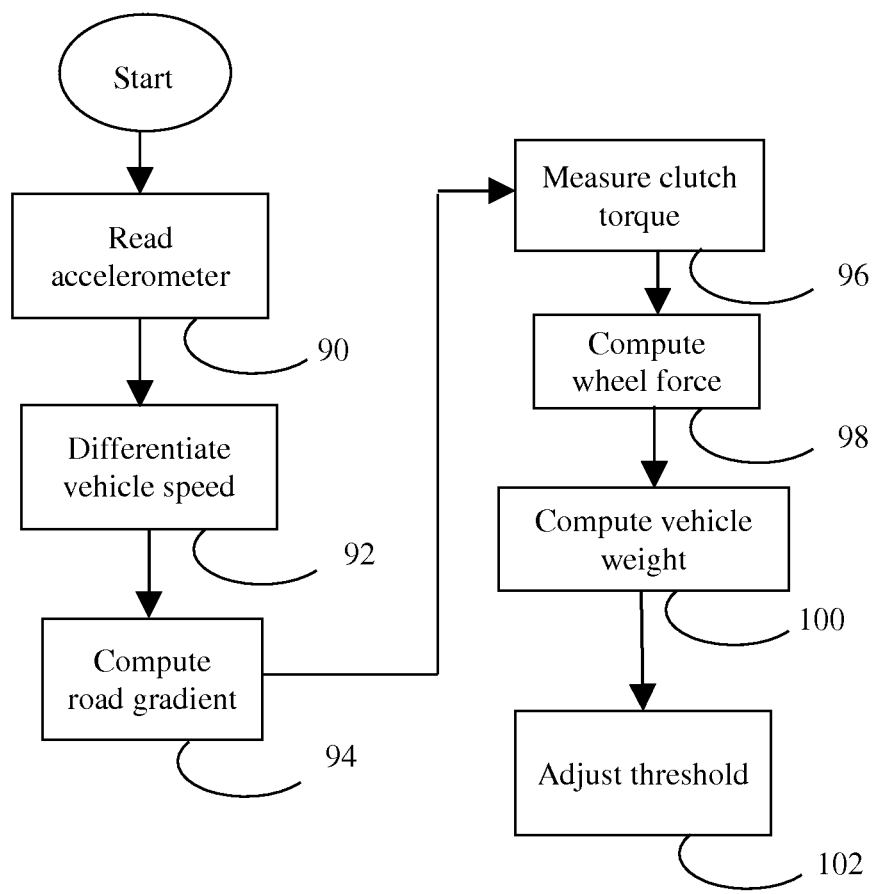
FIG. 4 is a flow chart for a method of adjusting a threshold used in the method of FIG. 3 based on vehicle weight and road gradient.

The controller can determine the current vehicle weight and road gradient by various methods. A suitable method to perform this computation is described in detail in U.S. patent application Ser. No. 14/215,812, filed Mar. 17, 2014, which is incorporated by reference herein. Another suitable method is illustrated in FIG. 4. At 90, the controller reads an accelerometer that is oriented along the longitudinal axis of the vehicle. An accelerometer so oriented registers an acceleration when the vehicle is increasing in speed and also when the vehicle is going uphill at constant speed. At 92, the controller numerically differentiates a reading from a vehicle speed sensor or another suitable measure of vehicle speed. By comparing these two values and 94, the controller can determine what portion of the accelerometer reading is caused by road gradient and then calculates the road gradient. While the vehicle is launching, the controller measures the clutch torque at 96. Combining the clutch torque with information about gear ratio and tire size, the controller calculates tire tractive force at 98. Based on the tractive force, road gradient, and derivative of vehicle speed, the controller can estimate vehicle mass at 100. Finally, the controller adjust the energy threshold at 102. Specifically, the controller increases the threshold for above heavy weights and for uphill road gradients. The controller may also decrease the threshold from the nominal threshold for lighter weights and downhill road gradients.

In addition to energy dissipation during launch events, the clutch also dissipates energy during shift events. After engaging the new gear ratio, the driver must re-engage the clutch. If the engine is below the speed required for the vehicle speed and new gear ratio, engaging the clutch will increase the engine speed. In this circumstance, the output torque will be negative while the engine speed is increasing. Since negative torque is generally unpleasant, it is more common to err on the side of maintaining the engine speed somewhat higher than required for the vehicle speed and new gear ratio. As the clutch is re-engaged, the clutch torque tends to decrease the engine speed to the required value. However, if the driver is simultaneously commanding engine torque, the engine speed will not decrease as quickly, extending the re-engagement and increasing the amount of energy dissipated by the clutch. Following a shift event, the controller can calculate the amount of energy dissipated based on the speed difference and torque capacity. If the energy dissipated is above a threshold, the controller suggests that the driver either set the engine speed lower before re-engaging the clutch or delay commanding engine torque. The method for shift events is analogous to the method for launch events as illustrated in FIG. 3 except that the vehicle is not stationary in the initial condition and the method is initiated by a change in gearbox ratio. The energy threshold for shift events is not necessarily the same as the threshold energy for launch events.

The adverse impact of excessive clutch energy dissipation are most severe if multiple events occur in a short period of time because there is little opportunity for the clutch to dissipate the energy as heat. In this circumstance, the clutch temperature increases. A given energy dissipation causes more clutch wear when the clutch is hot than if the clutch is cool. If the clutch is too hot, the friction coefficient decreases, decreasing the maximum torque capacity. In extreme cases, the decreased maximum torque capacity may cause the clutch to slip during normal driving.

The controller can estimate the clutch temperature based on the calculated energy input and a model of the heat dissipation rate. When the clutch temperature is higher, the controller may decrease the threshold at which suggestions are given. Additionally, the controller may suggest that the driver pull over and wait for the clutch to cool down. If a number of launch events occur within a predetermined amount of time, the controller may suggest that the driver wait to launch the vehicle until there is enough space between the vehicle and the vehicle ahead for the driver to stay in gear for longer.

Figure 5:
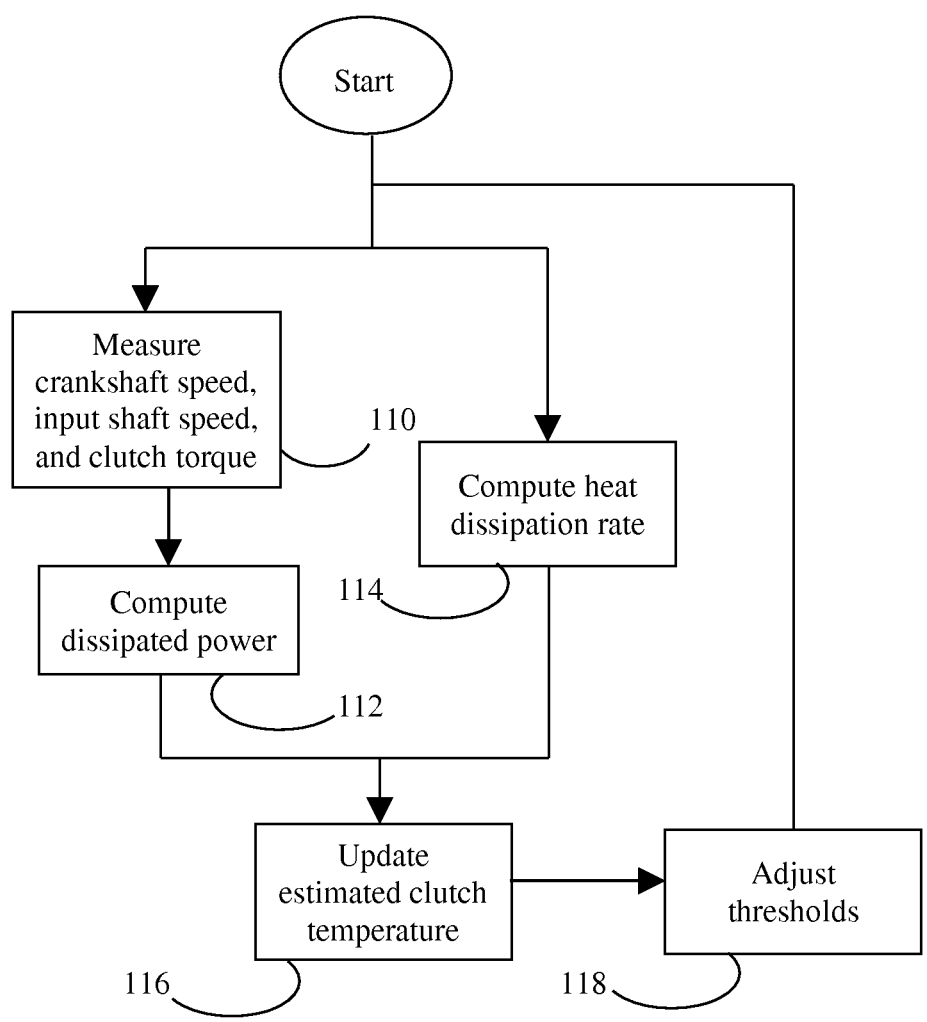
FIG. 5 is a flow chart for a method of adjusting a threshold based on an estimate of clutch temperature.

The method for adjusting the thresholds based on clutch temperature is illustrated in FIG. 5. At 110 and 112, the controller measures clutch torque and speed difference and computes the power dissipation in the same way as it does at 62 and 64 in FIG. 3. The power dissipation causes the clutch temperature to increase. At 114, the controller estimates the heat dissipation rate based on the current clutch temperature and a thermal model of the clutch. The thermal model may include the effects of other parameters such as the clutch speeds. Heat dissipation causes the clutch temperature to decrease. At 116, the controller adjusts the current temperature estimate based on the power dissipation, the heat dissipation, and the clutch thermal capacity. At 118, the thresholds for both launch events and shift events are adjusted. This process is repeated at regular intervals both during clutch events and during non-events.

When the vehicle is cruising in a fixed gear ratio, there is no need for the clutch to dissipate energy. In fact, this is the condition in which the clutch cools down by dissipating the accumulated heat. However, sometimes a driver accidentally rests a foot on the clutch pedal allowing some degree of clutch slip. The controller may detect this condition based on power dissipation exceeding a threshold level for a threshold amount of time while the clutch output speed exceeds the minimum speed at which the engine could generate the clutch torque. In response, the controller may suggest that the driver fully engage the clutch.

Figure 6:
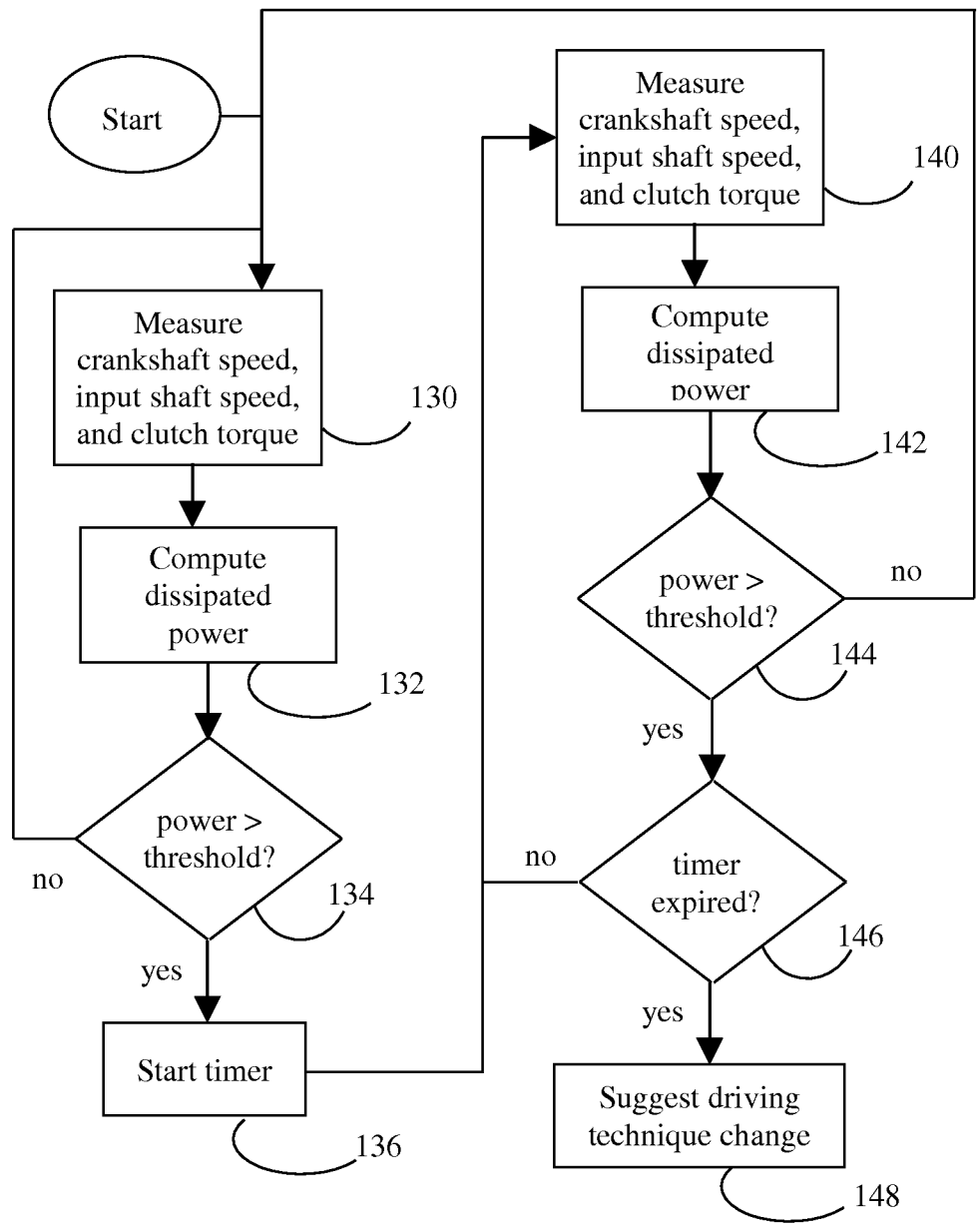
FIG. 6 is a flow chart for a second method of providing driving technique suggestions.

An alternate method of providing driving suggestions in illustrated in FIG. 6. In this method, the suggestion is triggered by a power dissipation exceeded a power threshold for a continuous period of time exceeding a time threshold. By using a variety of different power and time thresholds, this method is suitable for launch events, shift events, and inappropriate use of the clutch during cruising. An advantage of this method is that the suggestion may be provided before the event is completed. Each of these thresholds could be adjusted dynamically based on road gradient, vehicle weight, and clutch temperature as discussed above. At 130 and 132, the dissipated power is calculated as described for 62 and 64 in FIG. 3. At 134, the dissipated power is compared to a power threshold. If the dissipated power is low, control remains in the loop on the left. If the dissipated power is high, a countdown timer is started at 136 and control transitions to the loop on the right. At 140 and 142, the dissipated power is calculated as described for 62 and 64 in FIG. 3. At 144, if the dissipated power is below the threshold, control reverts to the loop on the left. If the dissipated power is still above the threshold and the timer has expired at 146, then a suggestion is provided at 148.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of coaching a driver of a vehicle having a manual transmission comprising:
   monitoring, in a controller, a clutch input speed, a clutch output speed, and a clutch torque;
   based on the input speed, output speed, and torque, estimating a clutch power dissipation; and
   in response to the power dissipation exceeding a power threshold for longer than a duration threshold, automatically outputting a suggested driving technique change to mitigate clutch degradation.

2. The method of claim 1 wherein outputting a suggested driving technique change comprises displaying a suggestion on a graphic display.

3. The method of claim 1 wherein outputting a suggested driving technique change comprises making an audible announcement through a speaker.

4. The method of claim 1 wherein outputting a suggested driving technique change comprises sending the suggestion to a third party through a communications interface.

5. A vehicle comprising:
   an engine;
   a transmission having a driver-controlled clutch; and
   a controller programmed to monitor a clutch input speed, a clutch output speed, and a clutch torque, to estimate a power dissipation based on the input speed, output speed, and torque, and to respond to the power dissipation exceeding a power threshold for more than a threshold time by suggesting a driving technique change to mitigate clutch degradation.

6. A method of coaching a driver of a vehicle comprising:
   in response to an estimated energy dissipation of a manual transmission clutch during a launch or shift event exceeding an energy threshold, automatically outputting a suggested driving technique change to mitigate degradation of the clutch on future events of a same type, wherein the estimated energy dissipation is based on an input speed, an output speed, and a torque capacity of the clutch.

7. The method of claim 6 further comprising adjusting the energy threshold based on an estimate of vehicle weight.

8. The method of claim 6 further comprising adjusting the energy threshold based on an estimate of road gradient.

9. The method of claim 6 further comprising:
   based on the input speed, the output speed, the torque, and a model of clutch cooling, estimating a clutch temperature; and
   adjusting the energy threshold based on the clutch temperature.

10. The method of claim 6 wherein the event is a vehicle launch beginning with the output speed equal to zero and ending with the output speed equal to the input speed.

11. The method of claim 10 wherein the suggested driving technique change comprises utilizing lower clutch torque capacity during future vehicle launch events.

12. The method of claim 10 wherein the suggested driving technique change comprises utilizing lower engine speed during future vehicle launch events.

13. The method of claim 6 wherein the event is a shift beginning with the output speed equal to the input speed and a first gearbox speed ratio established and ending with the output speed equal to the input speed and a second gearbox speed ratio established.

14. The method of claim 13 wherein the suggested driving technique change comprises utilizing lower engine speed while re-engaging the clutch during future shift events.

15. The method of claim 13 wherein the suggested driving technique change comprises delaying resumption of engine torque command until after the clutch is re-engaged during future shift events.

16. The method of claim 6 wherein the event is defined by clutch input speed exceeding clutch output speed and clutch output speed exceeding a minimum engine speed for more than a threshold duration and the suggested driving technique change comprises fully engaging the clutch.

17. The method of claim 6 wherein the suggested driving technique change comprises waiting for the clutch to cool down.

18. The method of claim 6 wherein the suggested driving technique change comprises waiting to perform future vehicle launches until more space exist between the vehicle and another vehicle.

* * * * *